2,998,716
SHAFT MOUNTING
Michael L. Rizzone, Dallas, Tex., assignor to United States Steel Corporation, a corporation of New Jersey
Filed Feb. 12, 1960, Ser. No. 8,304
8 Claims. (Cl. 64—1)

This invention relates to an improved shaft mounting.

The mounting is especially useful for shafts embodied in a drawworks used in well-drilling. A conventional drawworks includes several parallel horizontal shafts journaled in spaced apart upstanding support plates. The respective shafts carry sprockets which are chain-connected to one another for transmitting driving torques between shafts. For the mechanism to operate properly, it is essential that the shafts be positioned accurately, both as to their centers and lengthwise so that sprockets on different shafts are aligned. The massiveness of a drawworks makes it difficult to achieve the necessary precision. The usual practice has been to position the shafts on exact centers through precise machining of the parts, and lengthwise by inserting shims between bearing housings and support plates. This practice is costly and time-consuming and not altogether satisfactory, since the adjustment obtainable with shims is quite limited. Nevertheless it is apparent that a drawworks is only one example of an environment in which the mounting can be used, and my invention is not thus limited but has broader application for overcoming similar problems elsewhere.

An object of the invention is to provide an improved mounting which greatly simplifies the accurate positioning of a shaft.

A further object is to provide an improved mounting which enables a shaft to be adjusted lengthwise readily and without the use of shims, for example to align sprockets thereon with sprockets on another shaft.

A further object is to provide an improved mounting which enables a shaft to be positioned readily on a desired center and returned to the same position after removal.

A more specific object is to provide an improved mounting which includes adjustable means in the bearing housings for controlling the lengthwise position of a shaft and segments fixed to the support plates for controlling centering of the shaft.

Figure 1:
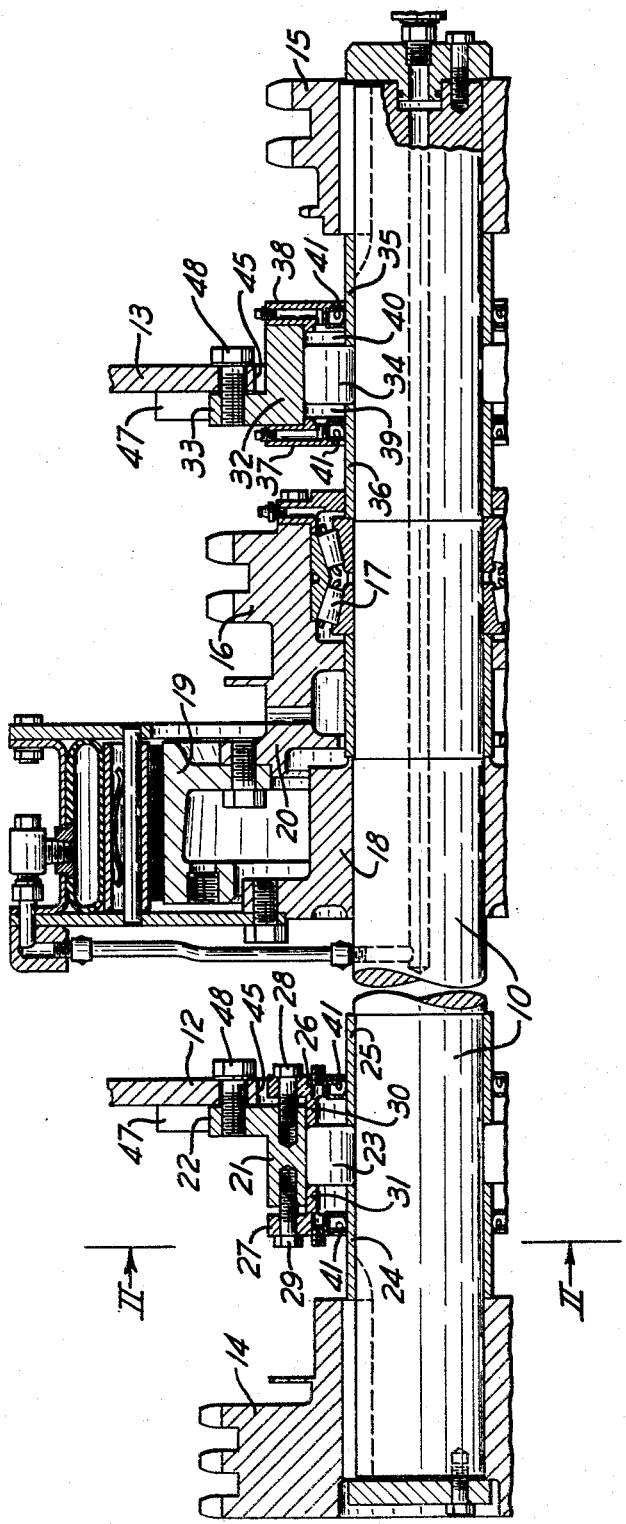
Figure 2:
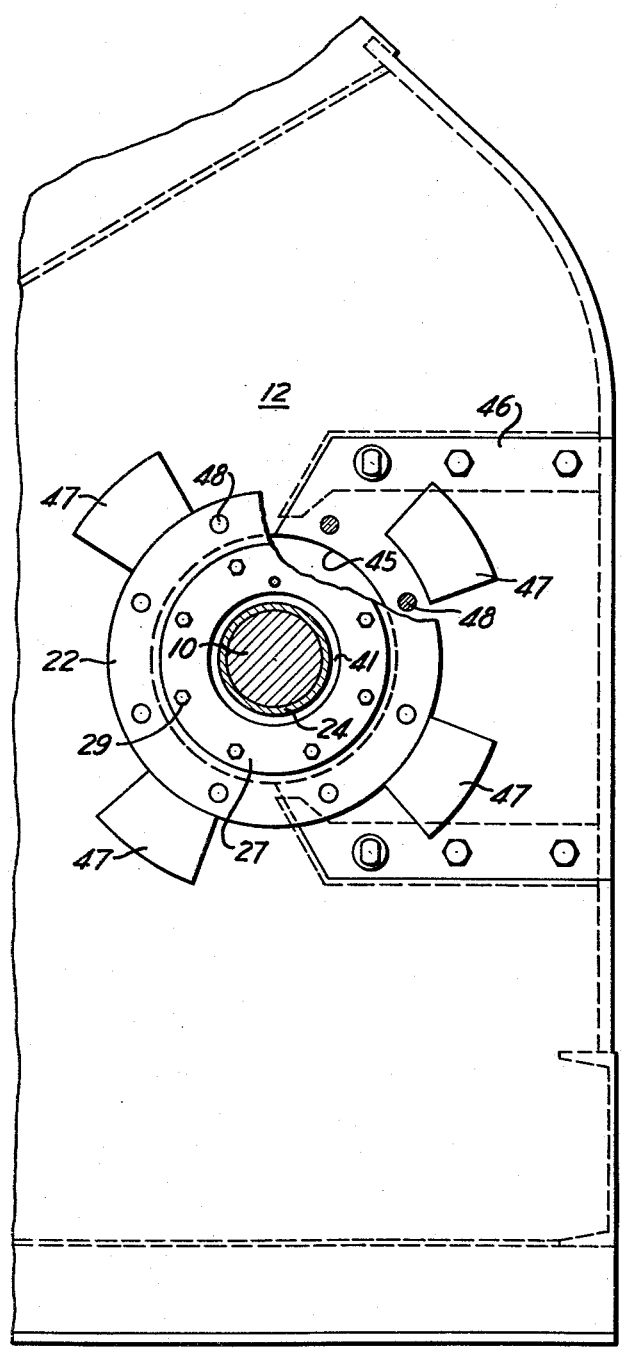

In accomplishing these and other objects of the invention, I have provided improved details of structure, a preferred form of which is shown in the accompanying drawings, in which:

FIGURE 1 is a fragmentary side elevational view of a drawworks shaft mounted in accordance with my invention; and FIGURE 2 is a vertical section taken on line II—II of FIGURE 1.

FIGURE 1 shows a typical drawworks shaft 10 rotatably supported on relatively fixed spaced apart upright plates 12 and 13. The shaft illustrated carries sprockets 14 and 15 keyed to its opposite ends outwardly of the respective plates, another sprocket 16 journaled intermediate its length on bearings 17, and the driving element 18 of a pneumatic clutch fixed adjacent sprocket 16. The driven element 19 of this clutch is fixed to a spider 20 integral with sprocket 16. Thus the shaft can rotate relative to sprocket 16, or the two can rotate together, depending on whether the clutch is engaged. The sprockets are held in fixed positions lengthwise of the shaft. Chains (not shown) run over the sprockets and over aligned sprockets on parallel shafts for transmitting driving torques between shafts. For example, shaft 10 can be an input shaft, sprocket 14 a driven sprocket, and sprockets 15 and 16 alternative driving sprockets. In this event sprocket 14 can be chain-connected with an external power source, and sprockets 15 and 16 chain-connected with sprockets on an output shaft for driving the latter at different speed ratios.

In accordance with my invention, the mounting means for the left end of shaft 10 includes an annular bearing housing 21, which has an integral flange 22 bolted to the outside of plate 12. Roller bearings 23 for shaft 10 are positioned inside the housing and are received between spacers 24 and 25 fixed to the shaft. Thus the spacers retain the bearings in a fixed lengthwise position with respect to the shaft. Inner and outer annular retainers 26 and 27 are attached to opposite ends of the bearing housing 21 for adjustment in a direction parallel to the length of the shaft. The attachment means includes inner and outer adjustable screws 28 and 29 threadedly engaged with tapped openings in the housing. Retainers 26 and 27 have integral lips 30 and 31 which abut opposite ends of bearings 23. The mounting means for the right end of the shaft includes a bearing housing 32, which has an integral flange 33 bolted to the inside of plate 13. Roller bearings 34 for the shaft are positioned within the housing and received between spacers 35 and 36 fixed to the shaft. Inner and outer annular retainers 37 and 38 are fixedly bolted to the bearing housing 32. The housing provides clearance spaces 39 and 40 between the latter retainers and the ends of bearings 34. The four retainers 26, 27, 37 and 38 carry conventional oil seals 41.

Plates 12 and 13 contain oversize openings 45 through which shaft 10 and portions of its mountings extend. As FIGURE 2 shows, plate 12 includes a separate inset 46 bolted to its main portion and extending from opening 45 to the adjacent peripheral edge of the plate. The outer face of the inset lies in the same vertical plane as the outer face of the main portion. Approximately half the circumference of opening 45 is formed on the main portion of plate 12 and half on the inset 46, whereby the shaft can be installed or removed when the inset is removed. The upright plate 13 is similarly constructed, except that preferably the inside faces of the inset and the remainder of the plate lie in the same vertical plane, and the bearing housing 31 is bolted to the inside, as already mentioned. In this manner plates 12 and 13 can be identical. Nevertheless it is apparent that an equivalent structure could result by making plates 12 and 13 as a "left" and a "right" and bolting the bearing housing 32 to the outside of plate 13. The openings 45 in the two plates are approximately aligned, but some distortion is almost inevitable in a structure the size of a drawworks.

In assembling the structure, I support it in a welding jig, place a dummy shaft in openings 45, and bolt the insets temporarily in place. The dummy shaft carries flanges which correspond with flanges 22 and 33. Since openings 45 are oversize, the dummy shaft and flanges are freely adjustable with respect to the plates. I center the shaft accurately, and weld a plurality of arcuate segments 47 to plates 12 and 13 abutting the circumference of the dummy flanges. In the preferred arrangement I weld the segments to the outside of plate 12 and to the inside of plate 13. Next I replace the dummy shaft with the actual shaft 10, having previously assembled the sprockets, bearings, etc., on the shaft. The segments 47 engage and confine the actual flanges 22 and 33 and thus assure that the shaft is properly centered. Thereafter I can insert and tighten bolts 48 which hold the flanges to the plates.

Next I can adjust the shaft to its proper lengthwise position. I make this adjustment by turning the screws 28 and 29 which fix the inner and outer retainers 26 and 27 to the left bearing housing 21. The lips 30 and 31 on the retainers bear against opposite ends of bearings 23 and thus force the bearings and shaft inwardly or outwardly with respect to the plates. The clearance spaces 39 and 40 allow the bearings 34 at the right to move with respect to the bearing housing 32 a sufficient distance to effect the necessary adjustment.

From the foregoing description, it is seen that my invention affords a simple mounting which facilitates positioning a shaft accurately, both as to its center and lengthwise. When the shaft is removed for any reason, it is readily replaced on the same center, and its lengthwise adjustment is always a simple operation. The need for shims is avoided altogether.

While I have shown and described certain preferred embodiments of my invention, it is apparent that other modifications may arise. Therefore, I do not wish to be limited to the disclosure set forth but only by the scope of the appended claims.

I claim:

1. In a structure which includes a pair of relatively fixed spaced apart supports and a shaft journaled in said supports, the combination therewith of a mounting for said shaft comprising first and second bearing housings fixed to the respective supports, bearings mounted within said housings, means on said shaft receiving the bearings within said first housing and holding them in a fixed position lengthwise of the shaft, inner and outer retainers abutting opposite ends of the bearings in said first housing, and adjustable means positively fixing both the inner and outer retainers to said first housing for adjusting the bearings therein and said shaft lengthwise with respect to said supports, said shaft being movable lengthwise with respect to said second housing.

2. In a structure which includes a pair of relatively fixed spaced apart supports and a shaft journaled in said supports, the combination therewith of a mounting for said shaft comprising first and second bearing housings fixed to the respective supports, bearings mounted within said housings, means on said shaft receiving said bearings and holding the bearings in fixed positions lengthwise of the shaft, inner and outer retainers abutting opposite ends of the bearings in said first housing, adjustable means positively fixing both the inner and outer retainers to said first housing for adjusting the bearings therein and said shaft lengthwise with respect to said supports, and inner and outer retainers fixed to said second housing and having clearance from the ends of the bearings therein, whereby the bearings in said second housing are movable lengthwise with respect thereto as the shaft is adjusted lengthwise.

3. In a structure which includes a pair of relatively fixed spaced apart supports and a shaft journaled in said supports, the combination therewith of a mounting for said shaft comprising first and second bearing housings having integral flanges fixed to the respective supports, roller bearings mounted within said housings, spacers fixed to said shaft on opposite ends of said bearings and holding the bearings in fixed positions lengthwise of the shaft, inner and outer retainers having lips abutting opposite ends of the bearings within said first housing, adjustable screws attaching said retainers to opposite ends of said first housing, said screws being adapted to adjust the position of said retainers with respect to said first housing and thereby adjust the lengthwise position of said shaft with respect to said supports, and inner and outer retainers fixed to said second housing and having clearance from the ends of the bearings therein, whereby the bearings in said second housing are movable lengthwise with respect thereto as the shaft is adjusted lengthwise.

4. In a structure which includes a pair of relatively fixed spaced apart supports having approximately aligned openings, and a shaft journaled in said supports and extending through said openings, the combination therewith of a mounting for said shaft comprising first and second bearing housings having flanges fixed to the respective supports around said openings, bearings mounted within said housings, means on said shaft receiving the bearings within said first housing and holding them in a fixed position lengthwise of the shaft, inner and outer retainers adjustably fixed to said first housing and abutting opposite ends of the bearings therein for adjusting these bearings and said shaft lengthwise with respect to said supports, said shaft being movable lengthwise with respect to said second housing, said openings being oversize with respect to said shaft, and means on said supports engaging said flanges to center said shaft.

5. In a structure which includes a pair of relatively fixed spaced apart supports having approximately aligned openings, and a shaft journaled in said supports and extending through said openings, the combination therewith of a mounting for said shaft comprising first and second bearing housings having flanges fixed to the respective supports around said openings, bearings mounted within said housings, means on said shaft receiving said bearings and holding the bearings in fixed positions lengthwise of the shaft, inner and outer retainers adjustably fixed to said first housing and abutting opposite ends of the bearings therein for adjusting these bearings and said shaft lengthwise with respect to said supports, inner and outer retainers fixed to said second housing and having clearance from the ends of the bearings therein, whereby the bearings in said second housing are movable lengthwise with respect thereto as the shaft is adjusted lengthwise, said openings being oversize with respect to said shaft, and means fixed to said supports and engaging the circumference of the respective flanges to center the shaft.

6. In a structure which includes a pair of relatively fixed spaced apart upright plates having approximately aligned openings and a shaft journaled in said plates and extending through said openings, said plates having removable insets leading to said openings to enable the shaft to be inserted or removed, the combination therewith of a mounting for said shaft comprising bearing housings having integral flanges fixed to the respective plates around said openings, bearings mounted within said housings and supporting said shaft, means for adjusting said shaft lengthwise with respect to said plates, said openings being oversize with respect to said shaft, and a plurality of arcuate segments welded to said plates and engaging the circumference of the respective flanges to center the shaft.

7. In a drawworks which includes a pair of relatively fixed spaced apart upright plates having approximately aligned openings, a shaft journaled in said plates and extending through said openings, and at least one sprocket carried by said shaft, the combination therewith of a mounting for said shaft comprising first and second bearing housings having flanges fixed to the respective plates around said openings, bearings mounted within said housings, means on said shaft receiving the bearings within said first housing and holding them in a fixed position lengthwise of the shaft, inner and outer retainers adjustably fixed to said first housing and abutting opposite ends of the bearings therein for adjusting these bearings and said shaft lengthwise with respect to said plates, said shaft being movable lengthwise with respect to said second housing, said openings being oversize with respect to said shaft, and a plurality of arcuate segments welded to said plates and engaging the circumference of the respective flanges to center said shaft.

8. In a drawworks which includes a pair of relatively fixed spaced apart upright plates having approximately aligned openings, a shaft journaled in said plates and extending through said openings, and at least one sprocket carried by said shaft, said plates having removable insets leading to said openings to enable the shaft to be inserted or removed, the combination therewith of a mounting for said shaft comprising first and second bearing housings having integral flanges fixed to the respective plates around said openings, roller bearings mounted within said housings, spacers fixed to said shaft on opposite ends of said bearings and holding the bearings in fixed positions lengthwise of the shaft, inner and outer retainers having lips abutting opposite ends of the bearings within said first housing, adjustable screws attaching said retainers to opposite ends of said first housing, said screws being adapted to adjust the position of said retainers with respect to said first housing and thereby adjust the lengthwise position of said shaft with respect to said plates, inner and outer retainers fixed to said second housing and having clearance from the ends of the bearings therein, whereby the bearings in said second housing are movable lengthwise with respect thereto as the shaft is adjusted lengthwise, said openings being oversize with respect to said shaft, and a plurality of arcuate segments welded to said plates and engaging the circumference of the respective flanges to center said shaft.

References Cited in the file of this patent

UNITED STATES PATENTS

| | | |
|---|---|---|
| 1,210,280 | Drake | Dec. 26, 1916 |
| 2,227,697 | Blood | Jan. 7, 1941 |
| 2,844,802 | Tripp et al. | July 22, 1958 |
| 2,905,008 | Sears | Sept. 22, 1959 |